United States Patent
Smith (10) Patent No.: US 9,605,834 B2
(45) Date of Patent: Mar. 28, 2017

(54) LED LIGHT ASSEMBLY

(71) Applicant: Whelen Engineering Company, Inc., Chester, CT (US)

(72) Inventor: Todd J. Smith, Deep River, CT (US)

(73) Assignee: Whelen Engineering Company, Inc., Chester, CT (US)

(*) Notice: Subject to any disclaimer, the term of this patent is extended or adjusted under 35 U.S.C. 154(b) by 84 days.

(21) Appl. No.: 14/304,200

(22) Filed: Jun. 13, 2014

(65) Prior Publication Data
US 2014/0369050 A1   Dec. 18, 2014

Related U.S. Application Data

(60) Provisional application No. 61/834,500, filed on Jun. 13, 2013.

(51) Int. Cl.
| F21V 13/04 | (2006.01) |
| F21V 13/00 | (2006.01) |
| B60Q 1/26 | (2006.01) |
| B60Q 1/32 | (2006.01) |
| F21Y 101/00 | (2016.01) |

(52) U.S. Cl.
CPC ............ *F21V 13/04* (2013.01); *B60Q 1/2611* (2013.01); *B60Q 1/323* (2013.01); *F21Y 2101/00* (2013.01)

(58) Field of Classification Search
CPC .......... F21V 13/00; F21V 13/02; F21V 13/04; B60Q 1/04; B60Q 1/16; B60Q 1/2611; B60Q 1/323; F21Y 2101/02
See application file for complete search history.

(56) References Cited

U.S. PATENT DOCUMENTS

| 1,235,275 A | * | 7/1917 | Wood | ............... F21S 48/137 362/298 |
| 6,641,284 B2 | | 11/2003 | Stopa et al. | |
| 6,644,841 B2 | | 11/2003 | Martineau | |
| 6,739,738 B1 | | 5/2004 | Smith | |
| 7,008,079 B2 | | 3/2006 | Smith | |
| 7,083,313 B2 | | 8/2006 | Smith | |
| 7,690,826 B2 | | 4/2010 | Kim | |
| 2006/0158887 A1 | * | 7/2006 | Holder | ............... F21V 14/02 362/341 |

* cited by examiner

*Primary Examiner* — Andrew Coughlin
*Assistant Examiner* — Nathaniel Lee
(74) *Attorney, Agent, or Firm* — Alix, Yale & Ristas, LLP (57) ABSTRACT

A light assembly comprises an LED light source, a reflector, and an optical element assembly. The LED light source comprises a light emitting die and has an optical axis which extends from the light emitting die and perpendicular to a first plane. The reflector defines an optical cavity and has a reflective surface oriented to reflect light emitted by the light source incident to the reflective surface along a range of reflected angles. The optical element assembly comprises an optical element disposed in the path of the light emitted from the light source. The optical element is supported within the optical cavity by a connector arm, which has first and second ends. The first end is connected to the optical element and the second end supports the optical element assembly from behind the reflector.

17 Claims, 7 Drawing Sheets

LED LIGHT ASSEMBLY

BACKGROUND OF THE DISCLOSURE

The present disclosure relates to optical systems, and more particularly, to optical systems for use in connection with flood and area lights.

Emergency first responders require adequate ground lighting to perform essential tasks such as assessing a patient's injuries and performing appropriate life-saving medical care. Consequently, floodlights having sufficient intensity to light up the area surrounding the vehicle are widely utilized on emergency vehicles. While there is no widely-accepted standard for floodlighting on emergency vehicles, standards such as the Federal KKK Standard for ambulance lighting provide guidance as to the photometric intensity and light emission pattern required for triage.

When utilized in conjunction with motor vehicles, high intensity lights are traditionally mounted to the top front corners of the cab (so called "brow lights"), or mounted in an enclosure secured to a vertical side or rear face of the vehicle body. High intensity light sources such as halogen, metal halide, mercury vapor, sodium vapor, and arc lamps have been traditionally utilized to satisfy the photometric intensity requirements for floodlighting. While they emit light of sufficient intensity for the purposes of triage, prior art vehicle-mounted floodlights can be bulky, require frequent maintenance and require large amounts of electrical power. Additionally, cutting openings in vehicle body panels may be necessary to accommodate the depth of prior art floodlights.

Light emitting diode (LED) light sources are commercially available that emit light having sufficient intensity to make them a viable light source in floodlights. Although the total optical energy emitted by a single LED continues to improve, multiple LED lamps are utilized to emit the intensity required for floodlight and area light applications. Optical systems are typically utilized to combine the light output of multiple LED lamps to attain a desired intensity and light emission pattern.

Traditional optical assemblies are symmetrical and may form a beam centered on the optical axes of the LED lamps. Prior art optical systems may utilize a concave metalized reflector and a centrally-positioned optical lens. While the light source, reflector and optical lens are precisely designed in prior art LED floodlights, interruptions or holes in the metalized reflectors are necessary to correctly position the optical lens directly in front of the light source. The interruptions, which receive screws or standoffs, compromise the pattern and intensity of the light emitted.

Accordingly, there is a need in the art for a compact and low profile optical assembly that emits required intensities and patterns of light.

SUMMARY

Briefly stated, a light assembly in accordance with the present disclosure comprises an LED light source, a reflector, and an optical element. The LED light source (also referred to as an LED lamp) includes a light emitting die and has an optical axis extending from the light emitting die perpendicular to a first plane. A plurality of individual LED lamps may be utilized in a single light assembly to generate a light emission pattern having sufficient photometric intensity for use in floodlights.

The reflector defines an optical cavity having a reflective surface. The reflective surface is oriented to reflect light emitted by the LED light source and incident on the reflective surface along a range of reflected angles. In one embodiment the reflective surfaces define sidewalls having a generally parabolic shape, and a reflector axis intersects with the optical axis and bisects the sidewalls.

The optical element assembly comprises an optical element and a connector arm. The optical element is disposed in the path of the light emitted from the LED light source and has a periphery radially spaced from the reflective surface. The connector arm supports the optical element within the optical cavity. The optical element is connected to the arm at a first end, while a second end of the arm secures the optical element assembly from a position behind the reflector at a point eccentric to the cavity and the optical axis. The lens is also eccentric to the cavity.

In one embodiment, a plurality of individual light assemblies are utilized in connection with a floodlight, area light, or similar high intensity light. The LED light sources are mounted to a PC board oriented parallel to the first plane. The first plane passes through the light emitting dies of the LED lamps. To save space and materials, a plurality of optical element assemblies in adjacent light assemblies are connected at the second end of the connector arm to a laterally extending base. One of ordinary skill in the art will understand that the light assemblies may be mounted to an alternate surface without departing from the scope of the present disclosure.

One object of the present disclosure is to provide a compact and low profile light assembly that may be utilized in high intensity lights for mounting to motor vehicles. Supporting the optical element assembly from behind at a point eccentric to the optical axes removes the necessity for screws or standoffs resulting in an uninterrupted reflecting surface having greater accuracy and efficiency. The dimensions and relative configuration of the optical element assembly and reflector result in low profile floodlights requiring less depth for mounting and may eliminate the need for openings in body panels. Additionally, the configuration of the optical element assembly and reflector in the present disclosure does not compromise the intensity and spread of light emitted from the light assembly.

BRIEF DESCRIPTION OF THE DRAWINGS

Aspects of the preferred embodiment will be described in reference to the Drawings, where like numerals reflect like elements.

DETAILED DESCRIPTION

Exemplary light assemblies illustrating various aspects of the present disclosure will now be described with reference to FIGS. 1 through 7, wherein like numbers refer to like parts. Throughout the figures, it will be understood by those of skill in the art that some features and components of the warning light are omitted for clarity.

Figure 1:
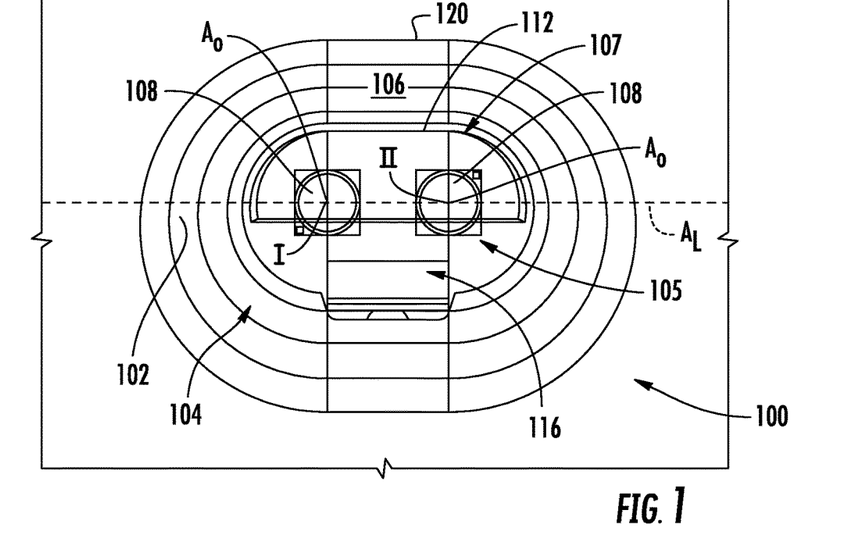
FIG. 1 shows a frontal view of one embodiment of a light assembly according to the present disclosure.
Figure 2:
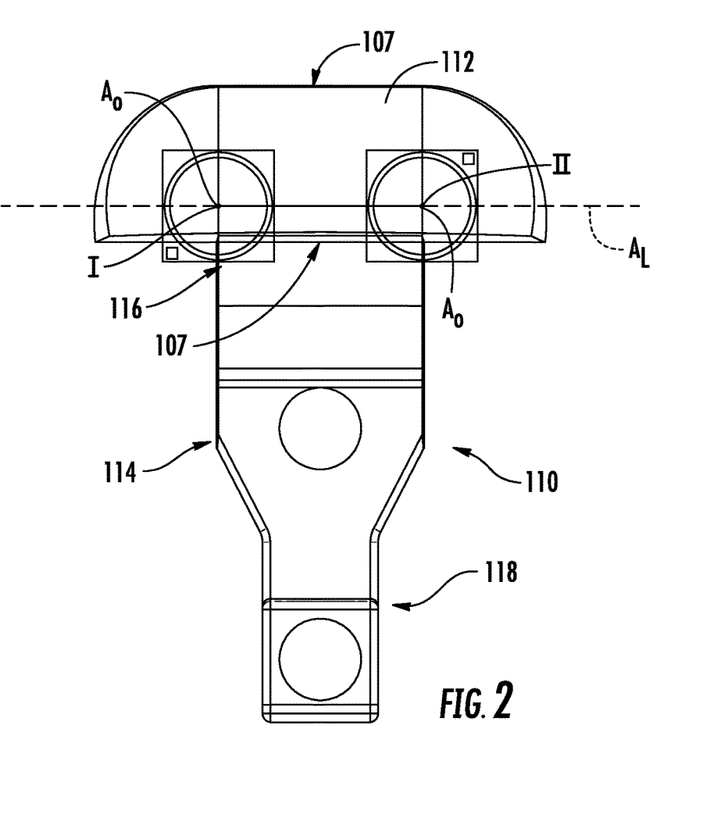
FIG. 2 shows a frontal view of the optical element assembly and LED light source of the light assembly of FIG. 1, the reflector is omitted for the purpose of clarity.
Figure 3:
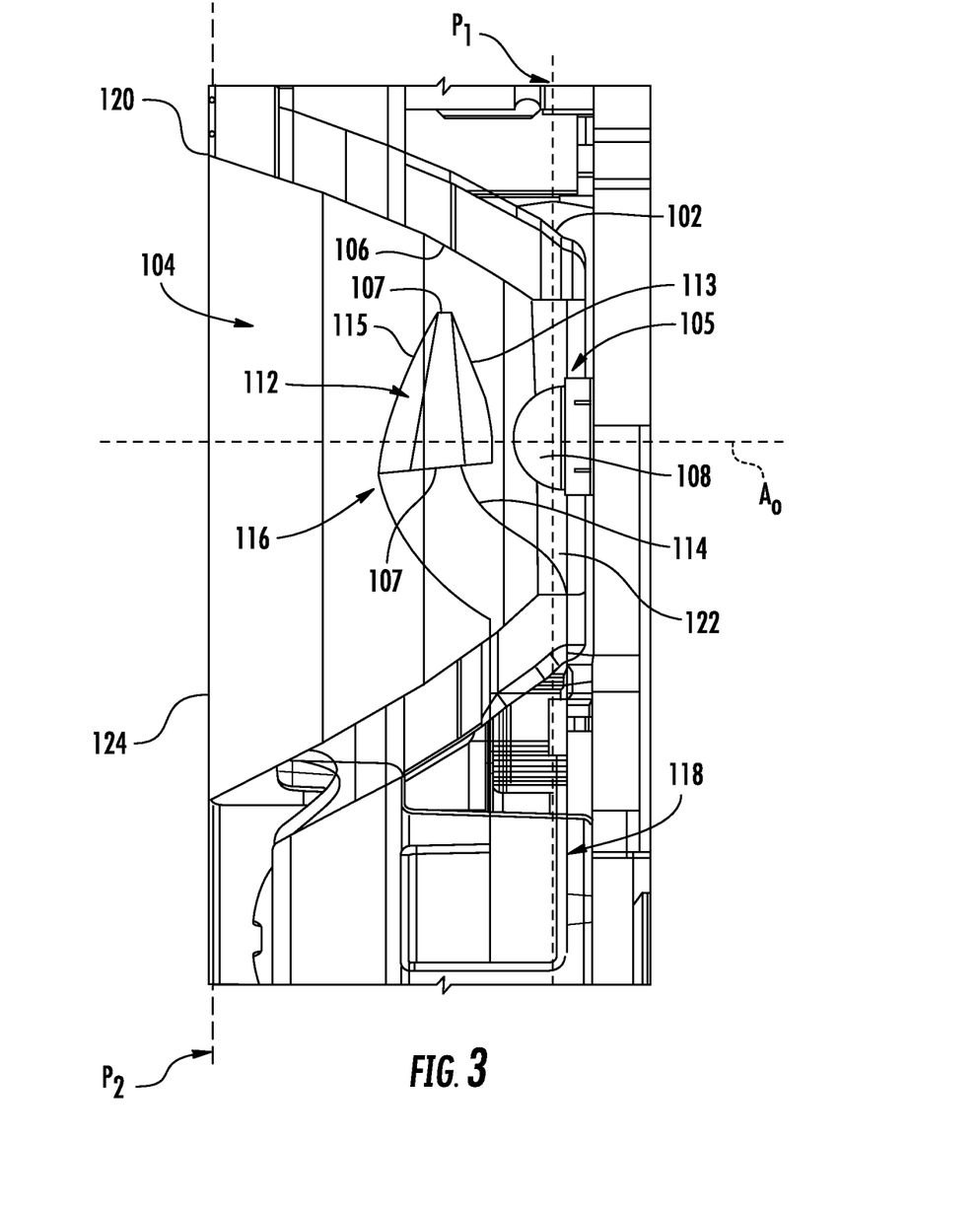
FIG. 3 shows a sectional view through the reflector and optical element assembly of FIG. 1.
Figure 3A:
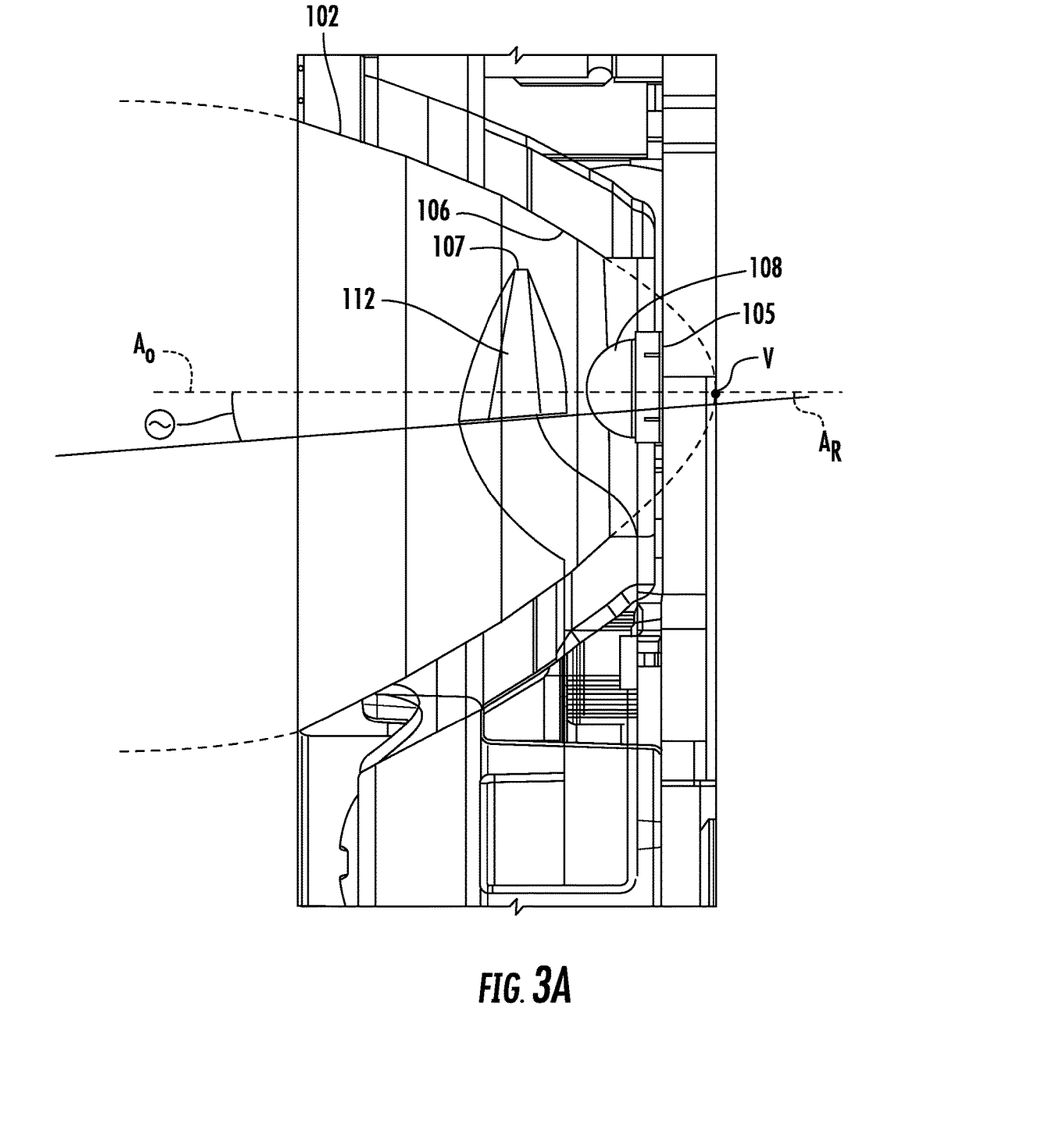
FIG. 3A shows a sectional view through the reflector and optical element assembly of an alternate embodiment.

FIGS. 1-4 illustrate an embodiment of a light assembly 100 according to aspects of the disclosure. The light assembly 100 is configured for use with high intensity lights such as floodlights or area lights. As best seen in FIGS. 1 and 3, the light assembly 100 has a reflector 102 which defines an optical cavity 104. The reflector 102 reflects light emitted by an LED light source 105 incident on a reflective surface 106 along a range of reflected angles. The light source 105 comprises a light emitting die 108 having an optical axis $A_O$ perpendicular to a first plane $P_1$ (FIG. 3A).

In the embodiment shown in FIGS. 1 and 2, the light source 105 comprises a pair of LED lamps 108 arranged along a laterally extending axis $A_L$. The laterally extending axis $A_L$ runs perpendicular to the optical axes $A_O$ of the light emitting dies 108, and the first plane $P_1$ contains the laterally extending axis $A_L$. One of ordinary skill in the art will understand that the size of the reflector 102 and optical cavity 104 may be altered to fit additional light emitting dies 108, without departing from the scope of the present disclosure.

Figure 4:
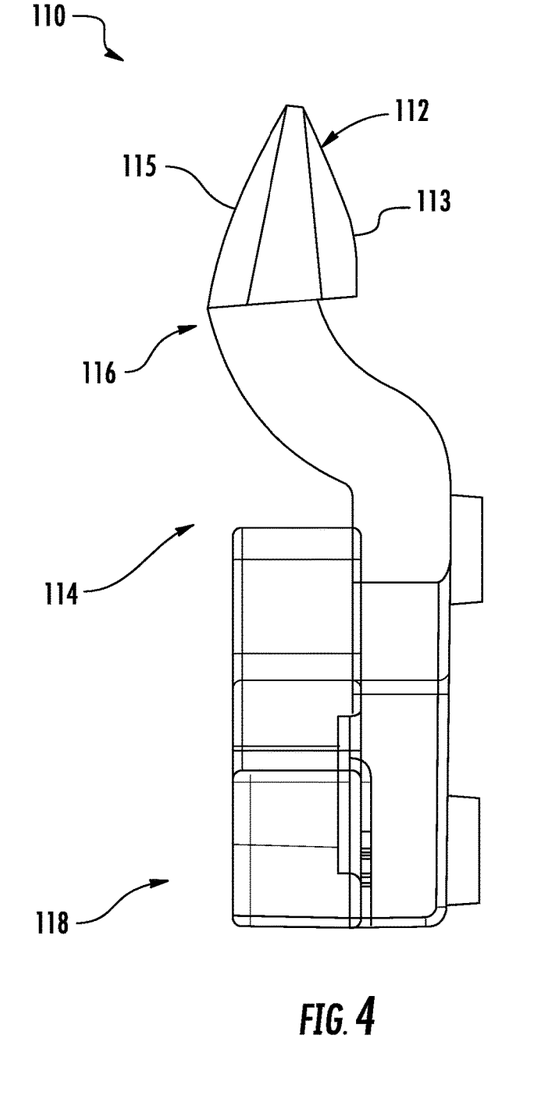
FIG. 4 shows a sectional view through the optical element of FIG. 1, the LED light source and reflector are omitted for the purpose of clarity.

An optical element assembly 110 is best seen in FIG. 4. The optical element assembly 110 comprises an optical element 112 and a connector arm 114 having first and second ends 116 and 118, respectively. The optical element 112 is disposed in the path of light emitted from the light source 105 and has a periphery 107 spaced radially apart from the reflective surface 106 of the reflector 102. As will be described in greater detail below, the reflector 102 and optical element assembly 110 cooperate to emit light in a specific direction with respect to the optical axis $A_O$.

As shown in FIG. 2 the optical element 112 may comprise an optical lens having a substantially constant sectional configuration between points I-II. The sectional configuration is rotated about the optical axis $A_O$ to form the ends 111 of the optical element 112. In the embodiment shown in FIG. 3, the points I-II are coaxial with the optical axes $A_O$. The optical element 112 is primarily defined by a light entry surface 113 and a light emission surface 115. The light entry surface 113 and light emission surface 115 are constructed to cooperatively refract light incident upon the optical element 112 into a direction contributing to a desired illumination pattern.

Referring to FIGS. 2, 3 and 4, the optical element 112 is secured to the connector arm 114 at the first end 116. The connector arm 114 is configured to secure the optical element within the optical cavity from behind the reflector 102 at a point eccentric to the cavity 104 and the optical axis $A_O$. The connector arm 114 may be secured according to any technique known in the art. For example, threaded fasteners (not shown) may secure the optical element in the correct position.

As shown in FIGS. 1 and 3, a PC board 120 parallel to and axially spaced from the first plane $P_1$ may define an optical cavity first end 122. The reflective surfaces 106 of the reflector 102 define sidewalls, and a peripheral edge 120 of the sidewalls defines an optical cavity second end 124. The cavity second end 124 is axially spaced from the cavity first end 122 in the direction of light emission and defines a second plane $P_2$, parallel to the first plane $P_1$.

In the embodiment shown in FIG. 3, a portion of the connector arm 114 extends into the optical cavity 104. The connector arm 114 extends into the optical cavity and projects away from the first plane $P_1$ at a point intermediate the first and second arm ends 116 and 118. This configuration positions the optical element axially intermediate $P_1$ and $P_2$ and radially interior the reflective surfaces 106.

As best seen in FIG. 3A, the reflector 102 and optical element assembly 110 are cooperatively configured to reflect and refract light emitted by the light source 105 into a desired pattern. Light is emitted from each light emitting die 108 in a divergent hemispherical pattern such that little or no light is emitted at an angular orientation that is convergent with the optical axis $A_O$. The reflector and optical element cooperate to redirect at least a portion of the divergent light emitted from the light emitting die 108 into a range of angular orientations some of which converge with and pass through a plane $P_3$ which includes the axes $A_O$ and $A_L$.

Referring to FIG. 3A, the reflector 102 has a reflector axis $A_R$, which intersects with and is canted relative to the optical axis $A_O$ and the plane $P_3$. The reflector axis $A_R$ runs tangential to a portion of the periphery 107 of the optical element 112. Light is freely emitted (without reflection or refraction) along an arc between the reflector axis $A_R$ and the reflective surface 106. Most of the light emitted above the reflector axis $A_R$ passes through the optical element 112 and is refracted in a direction that passes through the optical axis $A_O$. $A_R$ is canted relative to $A_O$ an angle θ. The angle θ is selected to reflect divergent light in a specific pattern, providing a desired ground lighting effect. In one embodiment, θ is selected to provide an effect that mimics mounting the LED light sources 108 on an angle selected from approximately 5° to approximately 15° with respect to $A_O$.

In the embodiment shown in FIG. 3A, the reflective surfaces 106 define sidewalls having a generally parabolic shape. The term "parabolic" as used in this disclosure means "resembling, relating to or generated or directed by, a parabola." Thus, parabolic is not intended to refer only to surfaces or curves strictly defined by a parabolic equation, but is also intended to encompass variations of curves or surfaces defined by a parabolic equation such as those described and claimed herein. As shown in FIG. 3A, the reflector axis $A_R$ bisects the parabolic shaped sidewalls and cooperates with the optical element 112 to redirect a portion of the divergent light. A parabola defined by the reflective surfaces 106 (shown partially in phantom) has a vertex V.

Figure 3B:
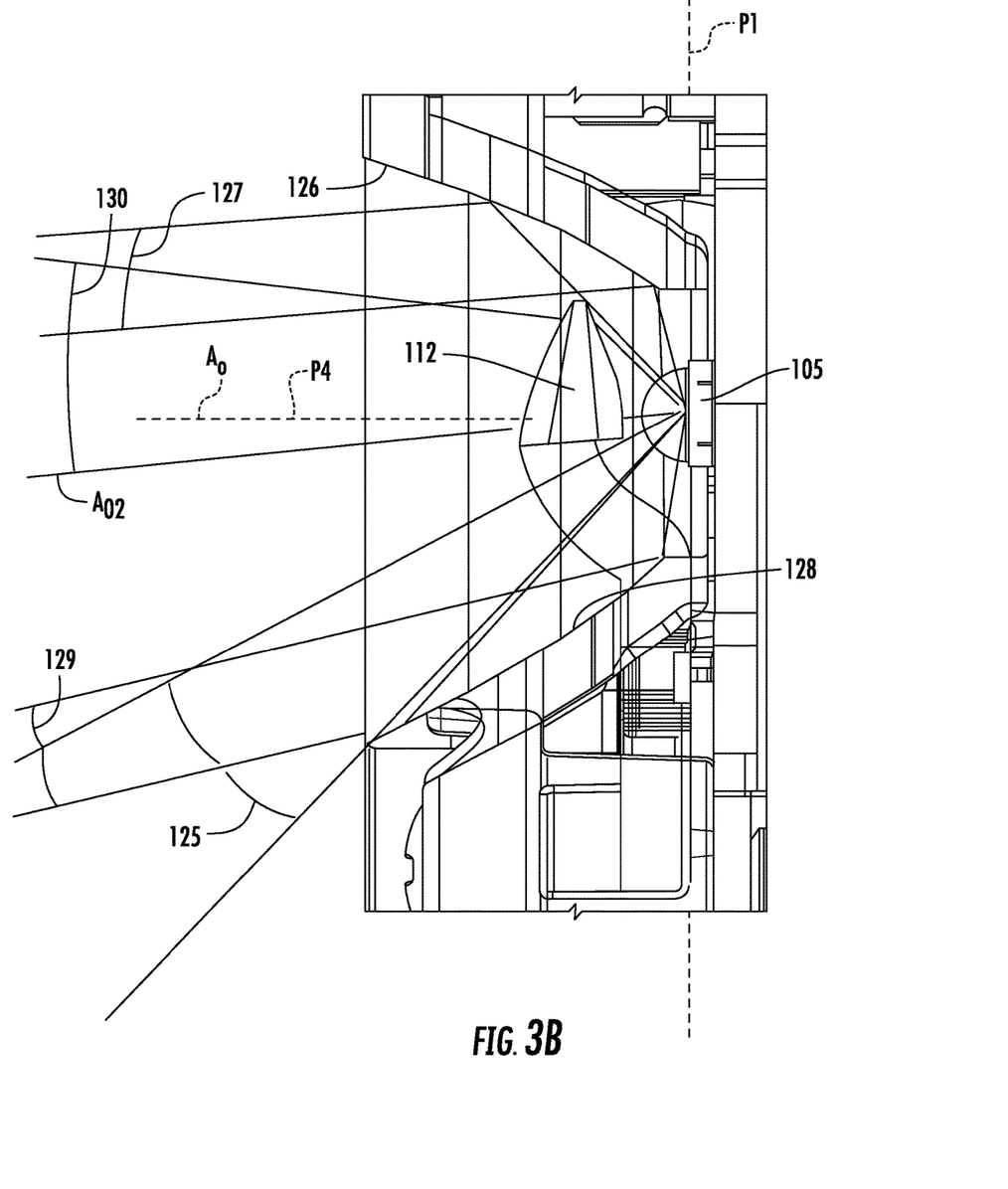
FIG. 3B shows light patterns emitted by the reflector and optical element assembly as depicted in FIG. 3

FIG. 3B is a sectional view through a light assembly incorporating an embodiment of an optical system according to aspects of the disclosure. The light assembly is shown with plane $P_1$ oriented vertically to illustrate an exemplary installed position and reference will be made to the vertical and horizontal directions represented by planes $P_1$ and $P_4$, respectively. The reflector 102 and optical element 112 have an axis of symmetry $A_{O2}$ that is canted at an angle of between approximately 5 to 15 degrees with respect to plane $P_4$ and the optical axis $A_O$ of the LED light source 105. This configuration is intended to generate a beam of light having a downward direction with respect to plane $P_4$, where the downward directed beam includes light passing through optical element 112 and redirected by reflector 102. Optical element 112 is asymmetrical with respect to plane $P_4$ and is arranged to redirect substantially all the light emitted from light source 105 emitted along trajectories above plane $P_4$, while permitting a significant portion of the light from light source 105 to escape from the light assembly without passing through the optical element 112 or being redirected by reflector 102 (which unredirected light is shown at reference numeral 125). It will be observed that the unredirected light 125 is emitted from the light source in a downward direction with respect to plane $P_4$ and reinforces the generally downwardly directed light emitted from the light assembly after redirection by the reflector 102 and optical element 112.

The portion of the reflector 126 above plane $P_4$ redirects light incident upon it into a range of reflected trajectories 127 at least a portion of which converge with and pass through plane $P_4$. The portion of the reflector 128 below plane $P_4$ redirects light incident upon it into a range of reflected trajectories 129, no portion of which converges with or passes through plane $P_4$. The optical element refracts light incident upon it into a range of refracted trajectories 130 at least a portion of which converge with and pass through plane $P_4$. When combined, light emerging from the disclosed assembly along trajectories 127, 129, and 130, form a beam canted in a downward direction with respect to plane $P_4$. This downward directed beam combines with and reinforces the light 125 that is emitted without redirection to form a light emission pattern from the assembly that is useful in illuminating an area of ground immediately adjacent a vertical surface to which the assembly is mounted. One non limiting example of such a vertical surface is the side panel of an ambulance, fire truck or rescue vehicle.

Figure 6:
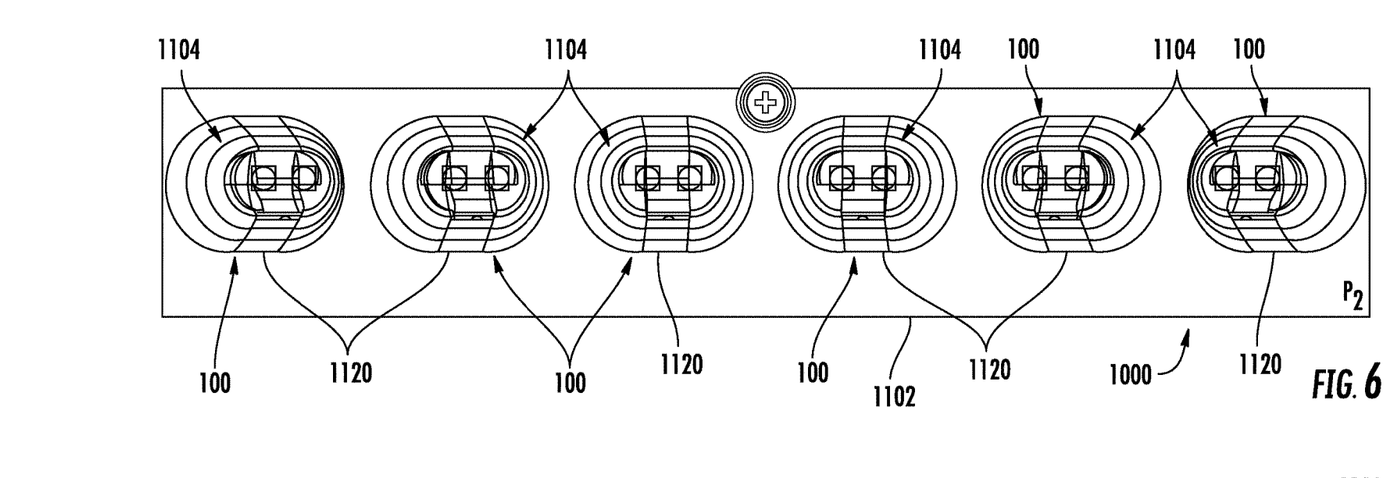
FIG. 6 shows a frontal view of an alternate embodiment of the light assembly of FIG. 1.
Figure 7:
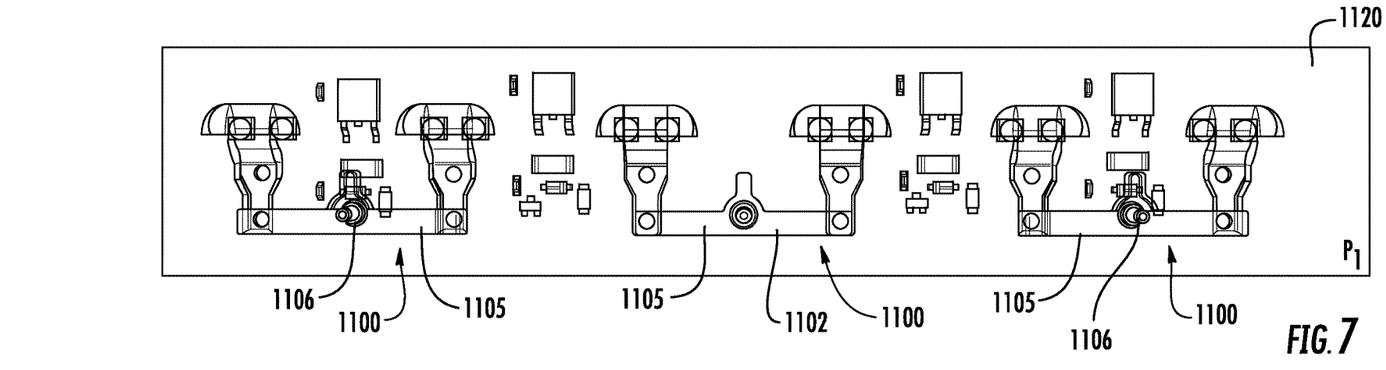
FIG. 7 shows a frontal view of the light assembly of FIG. 7, the reflector is omitted for the purpose of clarity.

FIGS. 6 and 7 show a floodlight 1000 incorporating the optical assembly 100 of the present disclosure. A PC board 1120 defines the first plane $P_1$ (FIG. 7), and a reflector 1102 extends radially outwardly from a peripheral edge 1120 of the reflector 1102. The reflector 1102 is a unitary piece of reflective material that defines each optical cavity 1104.

Figure 5:
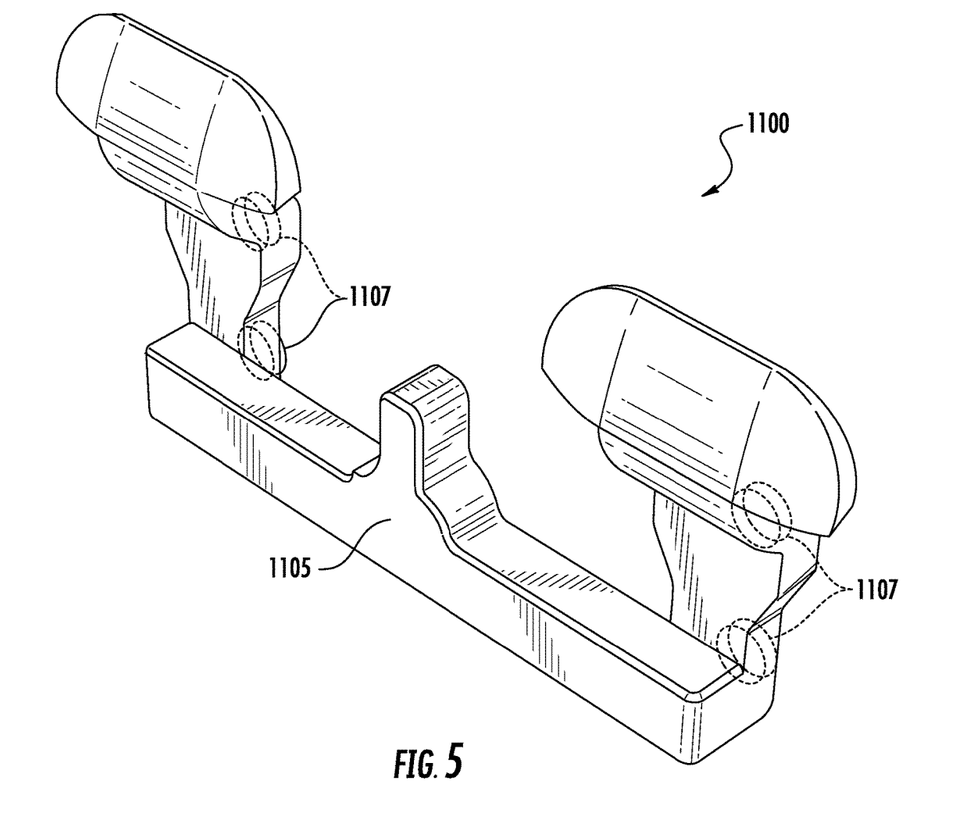
FIG. 5 shows an alternate embodiment of the optical element of FIG. 1.

In an alternate embodiment shown in FIGS. 5 and 7, an optical element assembly complex 1100 comprises a plurality of individual optical element assemblies 100. Each individual are connected to a laterally extending base 1105. Each individual optical element is connected to the laterally extending base at the connector arm second ends 118. The laterally extending base 1105 provides a common point of support for the each individual optical element 100. As seen in FIG. 7, a fastener 1106 secures each of the laterally extending bases 1102 to the PC board 1120.

In the embodiment shown in FIG. 5, a pair of generally cylindrical platforms 1107 project from each individual connector arm 114. The platforms 1107 are configured to secure the position of the optical element 112 within the cavity 1104. The platforms provide four or more points of contact, preventing vibration forces or warping of the PC board from displacing the exact configuration of the optical element assembly within the light 1000.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A light assembly having an illumination pattern, said light assembly comprising:
    an LED light source comprising a light emitting die in a first plane, an optical axis extending from said light emitting die and perpendicular to said first plane, said LED light source emitting light to one side of said first plane within a hemisphere centered on said optical axis, said hemisphere bisected by a second plane including said optical axis and perpendicular to said first plane;
    a reflector asymmetrical with respect to said second plane, said reflector surrounding said LED light source and configured to reflect the light from said LED light source into a range of reflected trajectories with respect to said second plane, said reflector comprising a first reflector surface, a second reflector surface, and a pair of end reflector surfaces intersected by said second plane, said first reflector surface spaced from said second plane in a first direction, said second reflector surface spaced from said second plane in a second direction opposite said first direction, at least a portion of the range of reflected trajectories from said first reflector surface including trajectories which converge with and pass through said second plane, no portion of the range of reflected trajectories from said second reflector surface converges with or passes through said second plane, said end reflector surfaces connecting said first and second reflector surfaces; and
    an optical element asymmetrical with respect to all planes parallel to and including said second plane and located in the path of light emitted from said LED light source, said optical element closer to said first reflector surface than said second reflector surface and defining a gap between said optical element and said second reflector surface, said optical element comprising a light entry surface and a light emission surface, said light entry and emission surfaces configured to refract light from said LED light source passing through said optical element into a range of refracted trajectories with respect to said second plane, at least a portion of which refracted trajectories converge with and pass through said second plane;
    wherein a portion of the light emitted from said LED light source exits the light assembly through said gap without redirection by either said optical element or said reflector.

2. The light assembly of claim 1, wherein said optical element further comprises a first edge facing said second reflector surface, said first edge defined by a third plane canted with respect to said second plane at an acute angle.

3. The light assembly of claim 1, wherein said LED light source is mounted to a PC board parallel to said first plane.

4. The light assembly of claim 3, wherein the optical element is attached to a connector arm having a first end connected to the optical element and a second end supporting the optical element and first end from behind the reflector surfaces.

5. The light assembly of claim 1, wherein said reflective surfaces define sidewalls having a generally parabolic shape, and wherein said sidewalls are bisected by a reflector axis intersecting with but canted at an acute angle θ relative to said optical axis.

6. The light assembly of claim 5, wherein θ is selected to provide a lighting effect which mimics mounting said LED light source on an angle selected from approximately 5° to approximately 15° with respect to said optical axis.

7. The light assembly of claim 1, wherein said LED light source comprises a plurality of light emitting dies arranged along a laterally extending axis perpendicular to said optical axes of said LED light sources.

8. The light assembly of claim 7, wherein each of said LED light sources comprises a pair of light emitting dies.

9. A high intensity light comprising:
    a PC board;

a plurality of light assemblies, each individual light assembly having an LED light source mounted to said PC board said LED light source comprising a light emitting die and having an optical axis extending from said light emitting die and perpendicular to a first plane passing through said light emitting die and parallel to said PC board, a reflector defining an optical cavity having a reflective surface oriented to reflect light emitted by said LED light source incident on said reflective surface along a range of reflected angles, and an optical element assembly having an optical element disposed in the path of light emitted from said LED light source and spaced apart from said reflective surface and supported within said optical cavity by a connector arm at a connector arm first end, and wherein a connector arm second end is connected to said PC board at a point eccentric to said optical cavity and said optical axis and supports said optical element and first end from behind said reflector.

10. The light of claim 9, wherein each of said light emitting dies is arranged along a laterally extending axis perpendicular to and intersecting with said optical axes of said light emitting dies.

11. The light of claim 10, wherein each of said individual LED light sources comprises a plurality of light emitting dies.

12. The light of claim 11, wherein each of said individual LED light sources comprises a pair of light emitting dies.

13. The light of claim 9, wherein said lens and said reflector are configured to cooperatively refract and reflect light emitted from said LED light source above a reflector axis intersecting with and canted relative to a third plane containing said optical axis.

14. The light of claim 9, wherein said reflective surfaces define sidewalls having a generally parabolic shape, and wherein said sidewalls are bisected by a reflector axis intersecting with but canted at an angle $\theta$ relative to said optical axis.

15. The light of claim 14, wherein $\theta$ is selected to provide a lighting effect which mimics mounting said LED light source on an angle selected from approximately 5° to approximately 15° with respect to the optical axis.

16. The light of claim 9, wherein optical element assembly complex comprises a plurality of said optical assemblies connected at said connector second end to a laterally extending base.

17. The light of claim 16, wherein a pair of cylindrical platforms project from each said connector arm, a fastener secures each of said optical assemblies to said PC board, and wherein said platforms are configured to secure the position of said optical element within the cavity.

* * * * *

UNITED STATES PATENT AND TRADEMARK OFFICE
CERTIFICATE OF CORRECTION

PATENT NO. : 9,605,834 B2  
APPLICATION NO. : 14/304200  
DATED : March 28, 2017  
INVENTOR(S) : Todd J. Smith Page 1 of 1

It is certified that error appears in the above-identified patent and that said Letters Patent is hereby corrected as shown below:

In the Claims

Column 6, Line 56:
Delete "8" and insert --0--

Column 8, Line 13:
Delete "8" and insert --0--

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*